United States Patent [19]

Austin et al.

[11] Patent Number: 5,333,948
[45] Date of Patent: Aug. 2, 1994

[54] MULTIPLE-GAIN ELECTRONIC BRAKE ACTUATOR WITH TRIGGER POINT INERTIAL SENSOR

[75] Inventors: Barry G. Austin, Marshall; Marcia S. Albright, Coldwater; Larry Eccleston, Marshall, all of Mich.

[73] Assignee: Tekonsha Engineering Company, Tekonsha, Mich.

[21] Appl. No.: 81,651

[22] Filed: Jun. 22, 1993

[51] Int. Cl.$^5$ .............................................. B60T 13/74
[52] U.S. Cl. ................................. 303/24.1; 188/158; 188/3 R; 303/7; 303/20
[58] Field of Search .............................. 303/24.1, 20, 7; 73/517 R, 510, 512; 200/61.45 R, 61.53, 61.52, 61.49; 188/181 A, 181 R, 3 R, 112 R, 158; 340/431, 669

[56] References Cited

U.S. PATENT DOCUMENTS

| | | | |
|---|---|---|---|
| 2,228,631 | 1/1941 | Kuiper | 188/3 |
| 3,601,794 | 8/1971 | Blomenkamp | 340/62 |
| 3,738,710 | 6/1973 | Pokrinchak et al. | 303/20 |
| 3,780,832 | 12/1973 | Marshall | 188/3 R |
| 3,908,782 | 9/1975 | Lang et al. | 180/103 |
| 3,909,075 | 9/1975 | Pittet, Jr. et al. | 303/24 C |
| 3,953,084 | 4/1976 | Pittet, Jr. et al. | 303/24 R |
| 3,955,652 | 5/1976 | Nilsson et al. | 188/112 |
| 3,967,863 | 7/1976 | Tomecek et al. | 303/24 C |
| 3,981,542 | 9/1976 | Abrams et al. | 303/20 |
| 3,981,544 | 9/1976 | Tomecek et al. | 303/21 AF |
| 4,030,756 | 6/1977 | Eden | 303/24 A |
| 4,050,550 | 9/1977 | Grossner et al. | 188/112 |
| 4,084,859 | 4/1978 | Bull et al. | 303/106 |
| 4,295,687 | 10/1981 | Becker et al. | 303/20 |
| 4,398,252 | 8/1983 | Frait | 364/426 |
| 4,721,344 | 1/1988 | Frait et al. | 303/20 |
| 4,726,627 | 2/1988 | Frait et al. | 303/24 R |
| 4,849,655 | 7/1989 | Bennett | 307/309 |
| 4,856,850 | 8/1989 | Aichele et al. | 303/20 |
| 5,032,821 | 7/1991 | Domanico et al. | 340/440 |
| 5,050,937 | 9/1991 | Eccleston | 303/20 X |
| 5,058,960 | 10/1991 | Eccleston et al. | 303/24.1 |
| 5,149,176 | 9/1992 | Eccleston | 303/20 |

OTHER PUBLICATIONS

"Linear Integrated Circuits Current Mode PWM Controller," Unitrode Disclosure Bulletin.

Primary Examiner—Douglas C. Butler
Attorney, Agent, or Firm—Price, Heneveld, Cooper, DeWitt & Litton

[57] ABSTRACT

An electronic controller for outputting pulses of current to actuate towed vehicle brakes includes a trigger point inertial sensor for varying the gain thereof. The trigger point inertial sensor includes a switch connected to the controller for switching the gain between two levels. In the preferred embodiment, the inertial sensor and switch comprise a mercury switch supported on a platform which is rotatable to adjust the switching threshold of the inertial sensor, and to adjust for the mounting position of the brake control.

31 Claims, 4 Drawing Sheets

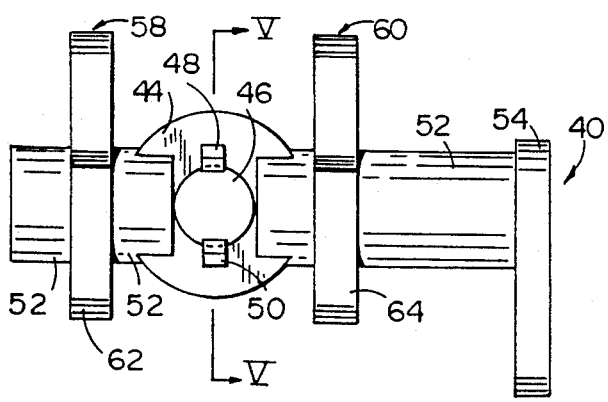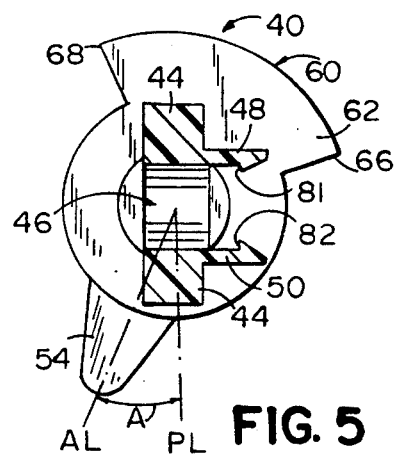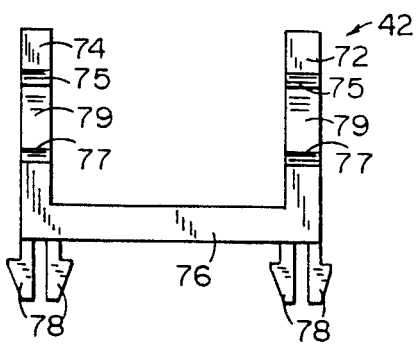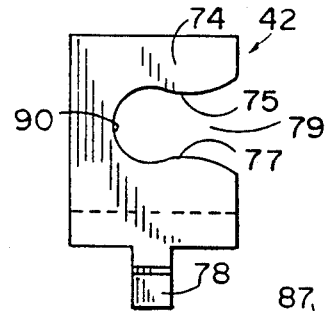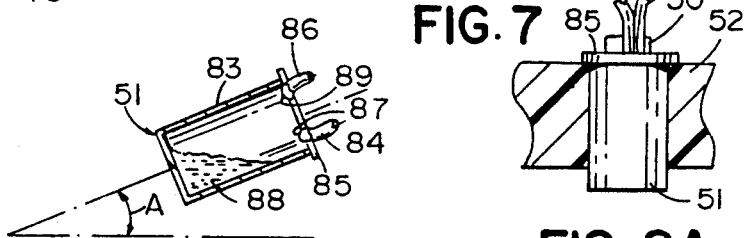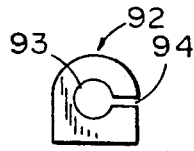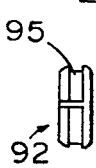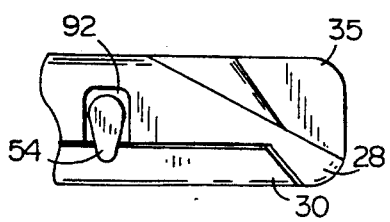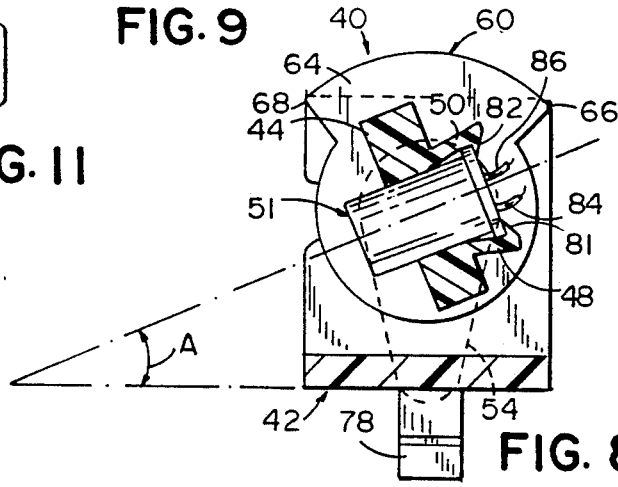

MULTIPLE-GAIN ELECTRONIC BRAKE ACTUATOR WITH TRIGGER POINT INERTIAL SENSOR

BACKGROUND OF THE INVENTION

This invention relates to controllers for electrically-actuated braking systems, such as those used to apply the brakes on towed vehicles (trailers) in response to commands from the towing vehicle. More particularly, the invention relates to a trigger point inertial sensor and electronic controller responsive to towing vehicle brake actuation and manual control signals to energize the towed vehicle brake-actuation components in a controlled manner.

Known electronic controllers for towed vehicles include systems which provide continuous or pulsing drive excitation to the electromagnetic brake shoe actuators located at the trailer wheels. Pulse drive controllers provide improved brake control over the relatively less complex continuous brake excitation controllers. Timer based drive controllers apply a predetermined gradually increasing brake excitation signal to the towed vehicle brakes during towing vehicle brake actuation. These signals typically increase from a minimum brake excitation level to a maximum brake excitation level in as little as two seconds. This rapid rise time makes soft braking virtually impossible. More sophisticated pulse drive controllers apply pulsing brake drive excitation current to the electromagnetic brake shoe actuators which is proportional in magnitude to control signals from a pendulum type or other such proportionally responsive inertial sensor in the towing vehicle, or manual control input signals. Such inertial sensor systems can generate so-called regenerative braking, wherein the towed vehicle braking initiated by the inertial sensor will be sustained or even increased until the inertial sensor experiences less deceleration, which cannot occur until the towed vehicle has been slowed very substantially. Thus, even though such inertial sensor type controllers represent a significant improvement over prior art controllers by providing a variable proportionally or representatively responsive brake control signal, it remains desirable to provide an electronic controller which overcomes the limitations and undesirable characteristics of heretofore known timer based electronic controllers without using a proportionally-responsive inertial sensor.

A difficulty encountered in providing effective timer based electronic controllers is providing optimum brake performance at different braking levels. These controllers are typically provided with a gain control which is manually adjusted to vary the magnitude of the brake excitation current applied to the electromagnetic brake components. The gain control is set by the operator to accommodate different trailer weights and each operator's desired brake system performance. Operators cannot set the gain for both hard (e.g., panic) and soft braking since each requires a different braking current characteristic for optimum performance. If the operator sets the gain of the electronic brake controller to a level which provides smooth braking at low level deceleration, the controller will not be set to an optimum level for hard braking. If the brake controllers are set to supply a brake excitation level which provides optimum panic braking performance, the brakes will be applied too hard for smooth low-level deceleration. Accordingly, operators who adjust the controller for optimum hard or soft braking will not have desirable braking under the other braking condition.

An operator may attempt to set a compromise level between optimum hard and soft braking. However, the brake excitation level required for optimum high-level deceleration (panic braking) can be up to 50% greater than that required for optimum low-level deceleration. Because of this disparity between the hard and soft braking levels, the compromise gain will not operate near the optimum level for either soft or panic braking. Any attempt to set a compromise gain level will provide less than ideal braking performance under both conditions (e.g., increased braking distances and time during panic braking conditions) because the brakes fade due to overheating and "hopping" and "jerking" will occur under low level deceleration. Although the towing vehicle brakes are capable of decelerating both the towed and towing vehicles when the towed vehicle brake controller operates at low gain settings, low gain settings of the towed vehicle brake controller during hard braking will cause the towing vehicle brakes to overheat and fade, producing longer stopping distances. Due to inherent characteristics of electric brake design, this difficulty is magnified at higher speeds and for greater trailer loads. Accordingly, it remains desirable to provide a timer brake controller with improved performance at different braking levels.

SUMMARY OF THE INVENTION

The present invention provides new and more effective controllers through the combined effect of a number of distinct features which vary in both concept and implementation from those found in prior art devices, and which combine synergistically to provide electronic brake controllers which are both more effective and more efficient than those utilized heretofore.

According to one aspect of the invention, multiple gains are provided for an electronic controller which electrically actuates a towed vehicle's brakes. The electronic controller includes a circuit producing pulses of current which are gradually increased for correspondingly energizing the vehicle brakes. The electronic controller also includes a trigger point inertial sensor which selects one of at least two gains for the controller. In one preferred embodiment, the gains are independently adjusted within predetermined ranges. The sensor selects a first gain when detected deceleration is below a predetermined threshold and a second gain when detected deceleration is above the threshold. This second gain produces a larger magnitude output signal to effect improved higher level or panic braking performance, whereas the lower gain is set to effect smooth low level braking. In addition to changing the gain, the switching of the inertial sensor also generates a different time versus current relationship for the circuit (i.e., changes the gain slope of the circuit).

According to another aspect of the invention, a trigger point inertial sensor assembly for an electronic brake controller includes an axle connected to a platform for supporting a switch. A handle coupled to the axle is accessible to the operator to adjust tile position of the platform. The switch is positioned in the platform such that the position of the switch may be adjusted using the handle. The position of the switch is adjusted to change the switching threshold thereof and to compensate for variations in the mounting position of the controller relative to true horizontal.

According to a still more detailed aspect of the invention, the trigger-point inertial sensor switch is provided by a mercury switch. The angle between the mercury switch and a horizontal plane is adjusted using a lever to change the threshold at which the gain of the electronic controller is switched. The mercury switch provides a snap-action inertial sensor which selects a low gain for soft braking and a high gain for hard braking. Accordingly, the gain is adjusted for both braking levels.

According to yet another aspect of the invention, an electronic controller for selectively actuating towed vehicle brakes includes a conductor connected between the output of the electronic controller and the towed vehicle brakes. The brake excitation pulses generated by the electronic controller are applied to the towed vehicle brakes through the conductor. A control coupled to the conductor holds the conductor at approximately ground potential when the towed vehicle is not connected to file electronic controller in the towing vehicle and allows the conductor to rise to a higher potential when the towed vehicle is connected to the electronic controller and brake excitation pulses are output by the electronic controller to energize the towed vehicle brakes.

The electronic controller according to the invention provides improved braking performance at both high and low levels. The brake controller operates without a pendulum or other proportional type inertial sensor to provide more effective braking at different braking levels than heretofore known systems lacking such a sensor. According to one particularly advantageous embodiment of the invention, high and low gains are adjusted independently to provide effective multiple level gain control.

These and other aspects, features and attributes of the invention will become more apparent after contemplation of the ensuing more detailed description, particularly when considered with and in light of the accompanying drawings, in which:

BRIEF DESCRIPTION OF THE DRAWINGS

FIG. 4 is a top plan view of a support for the trigger point inertial sensor;

FIG. 5 is a cross-sectional view of the support taken along plane V—V in FIG. 4;

FIG. 6 is a front elevational view of a mounting bracket for the support illustrated in FIGS. 4 and 5;

FIG. 7 is a side elevational view of the mounting bracket according to FIG. 6;

FIG. 8 is a cross-sectional view of the support and bracket taken along plane VIII—VIII in FIG. 3;

FIG. 8A is a side elevational view with the axle shown in fragmentary cross section taken along plane VIIa—VIIa in FIG. 3;

FIG. 9 is a side elevational view of a mercury switch for the sensor assembly according to FIGS. 3 through 8;

FIG. 10 is a fragmentary side elevational view of the brake controller according to FIG. 1;

FIG. 11 is a front elevational view of a grommet used in the brake controller according to FIG. 10;

FIG. 12 is a side elevational view of the grommet according to FIG. 11;

DETAILED DESCRIPTION OF THE PREFERRED EMBODIMENTS

Figures 1, 2, 3:
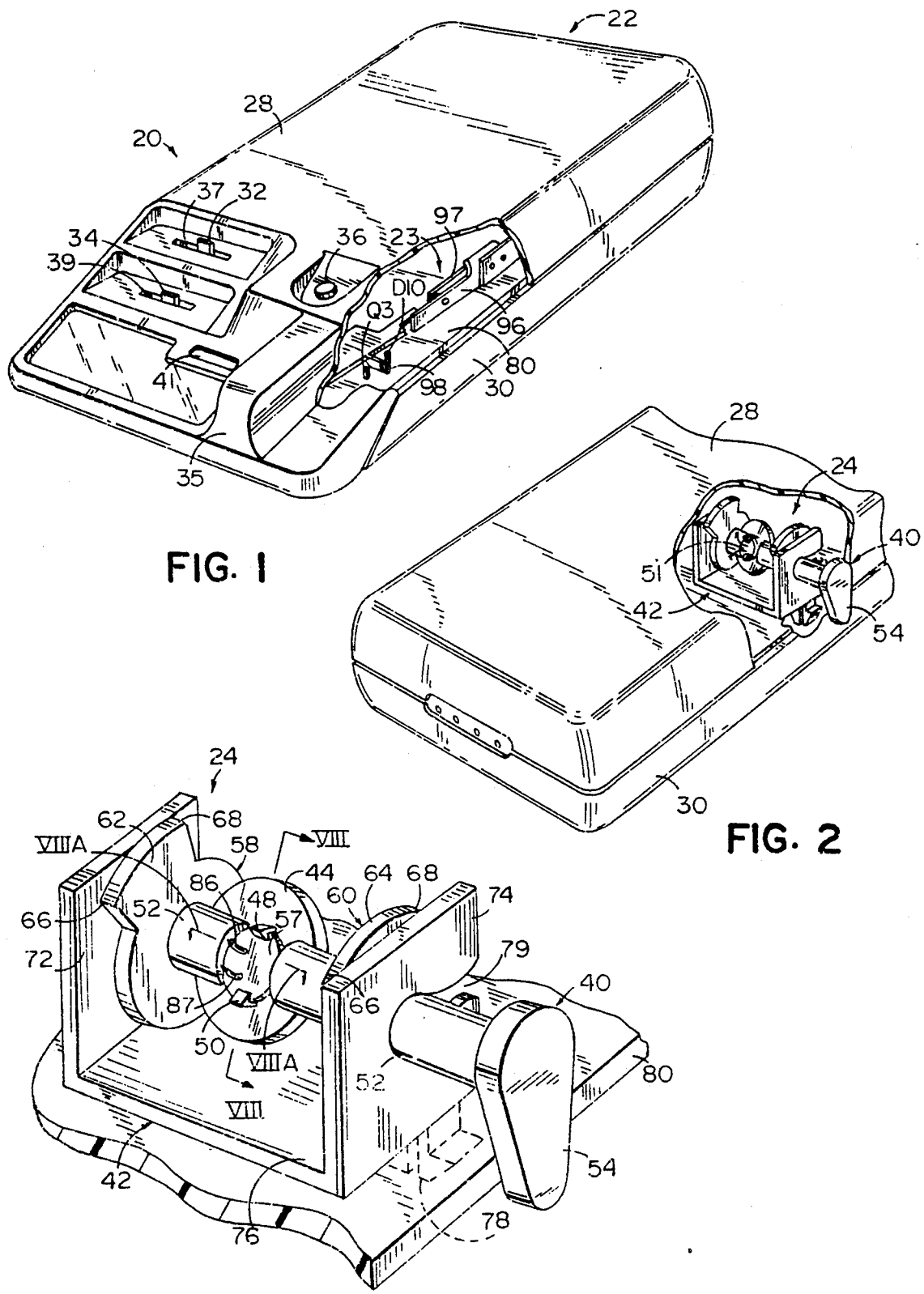
FIG. 1 is a top perspective view of the brake controller according to the invention with the housing partially broken away to show a manual control switch and shutter.
FIG. 2 is a fragmentary top perspective view taken from the opposite direction than FIG. 1 with the housing partially broken away to show a trigger point inertial switch assembly.
FIG. 3 is a fragmentary top perspective view of the trigger point inertial sensor assembly mounted on a printed circuit board shown broken away.

A brake controller 20 is illustrated in FIGS. 1 and 2 which includes a generally rectangular housing 22 for mounting to the interior of a towing vehicle in a conventional manner. A manual brake actuation control lever 35 is positioned on housing 22. A trigger point inertial sensor assembly 24 (FIG. 2) is mounted to a printed circuit board 80 positioned in housing 22. An electronic controller 26 (FIG. 13) is provided by components and conductors mounted on printed circuit board 80. A shutter and leaf spring switch assembly 23 (FIG. 1) connected to control lever 35, is also mounted on circuit board 80. Housing 22 also encloses other conventional brake controller components which are not described in greater detail herein.

Figure 13:
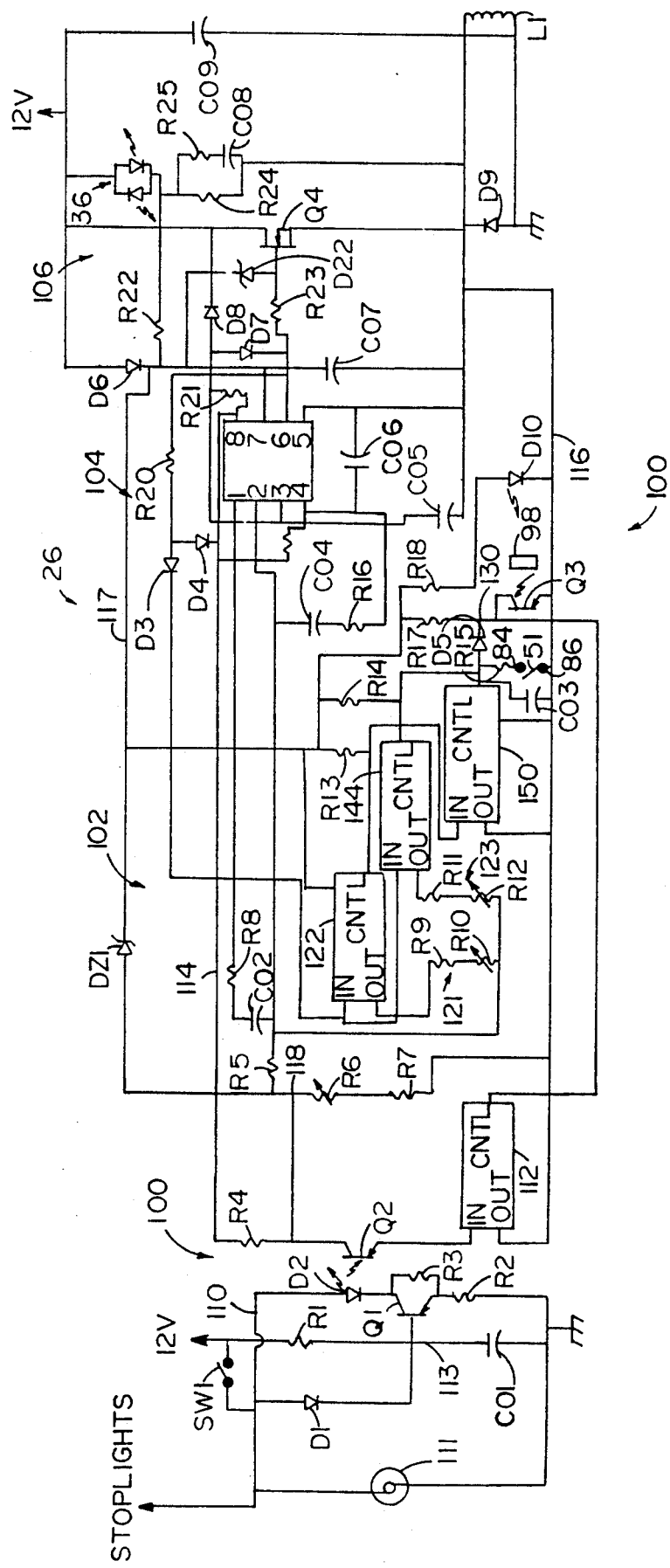
FIG. 13 is a schematic circuit diagram showing an electronic controller including a gain control in accordance with the invention.

With reference now to FIG. 13, the electronic controller 26 mounted on circuit board 80 (FIG. 1) is connected to inertial sensor 24 and switch assembly 23. Controller 26 (FIG. 13) is connected to the towing vehicle's stoplight circuit and floating battery positive terminal 117. The output of the electronic controller 26 is connected to the towed vehicle brakes, represented by inductor L1 in FIGS. 13 and 14, in a conventional manner. As described in greater detail hereinafter, electronic controller 26 is responsive to actuation of the towing vehicle stoplights, by the towing vehicle brake pedal being pressed, or to actuation of manual control lever 35, and to inertial sensor 24, to generate a towed vehicle brake excitation current in a novel manner.

Somewhat more particularly, housing 22 (FIGS. 1 and 2) of brake control 20 includes a top housing section 28 and a bottom housing section 30. Top section 28 is constructed of an integrally molded polymer by a conventional method. The bottom housing section 30 is constructed of a suitable metal, such as aluminum, which acts as a heat sink to efficiently conduct, and thereby dissipate, heat. The sections are joined using pegs (not shown) extending from housing section 28 through apertures (not shown) in housing section 30. The pegs are heated and formed onto the exterior surface of bottom 30, thereby locking the top and bottom sections together. Although the method by which the housing sections are joined is not critical to the operation of the electronic controller, the connection of the housing sections is disclosed since it represents a particularly desirable and advantageous characteristic of the overall brake controller 20.

A gain control selector 32, a gain control selector 34, and a manual control actuator 35 are accessible to the vehicle operator through top housing section 28 of housing 22. Selectors 32, 34 and manual control actuator 35 are mounted on board 80 and project through housing section 28. They may be mounted by any suitable conventional means (not shown) such that they slide in slots 37, 39, and 41, respectively, when actuated by a vehicle operator. An indicator 36 mounted on board 80 is positioned in an aperture in top housing section 28 to project through housing section 28 such that it visually indicates to the vehicle operator that the towing vehicle is electrically connected to the towed vehicle brake actuator and represents the magnitude of the braking current being applied to the towed vehicle brakes, as described in greater detail in U.S. Pat. No. 5,149,176, entitled CONTROLLER FOR ELECTRIC BRAKING SYSTEMS, issued on Sep. 22, 1992, to Larry Eccleston, the disclosure of which is incorporated herein by reference thereto.

The trigger point inertial sensor assembly 24 (FIG. 2) mounted in housing 22 includes a support 40 for a trigger point inertial sensor switch 51 and a mounting bracket 42 for receipt of support 40. Support 40 has a platform 44 with an aperture 46 (FIGS. 4 and 5) and flexible integral fingers 48 and 50 on opposite edges of aperture 46. Fingers 48 and 50 are best illustrated in FIGS. 5 and 8. The flexible fingers extend generally orthogonally to aperture 46 for retention of mercury switch 51 (FIGS. 8 and 9). Platform 44 is fixedly connected to an axle 52 which extends outwardly from a lever, or other handle, 54. Members 58 and 60, including outwardly projecting portions 62 (FIG. 3) and 64, are secured to axle 52 on opposite sides of platform 44. Edges 66 and 68 (FIG. 2) of members 58 and 60 will engage bracket 42 to limit the amount that support 40 rotates. Support 40 is of any suitable construction, such as integrally molded of a suitable polymer.

Mounting bracket 42 is generally U-shaped in profile and includes an arm 72 (FIG. 6) and an arm 74 projecting orthogonally from a shoulder 76. Arms 72, 74 each include a respective channel 79 (FIG. 7) for receipt of axle 52 of the trigger point inertial sensor support 40. Bracket 42 also includes flexible posts 78 extending orthogonally from shoulder 76. Posts 78 provide a snap-fit connection when received in an opening in printed circuit board 80 (FIG. 2). The connection of bracket 42 to circuit board 80 is the same as the connection of a pendulum-type accelerometer to a printed circuit board, which is described in greater detail in U.S. Pat. No. 5,058,960, entitled PENDULUM-TYPE ACCELEROMETER FOR ELECTRICALLY-ACTUATED BRAKING SYSTEMS issued to Eccleston et al. on Oct. 22, 1991, the disclosure of which is incorporated by reference herein. Bracket 42 is of any suitable construction, such as an integrally molded polymeric member.

Assembly of the trigger point inertial sensor assembly 40 will now be described with reference to FIGS. 3 through 8. To connect mercury switch 51 to support 40, the switch is pressed into fingers 48 and 50, such that these fingers are spread apart. After the switch passes projections 81 and 82 of these fingers, the fingers spring back as they are biased to pinch the switch therebetween. In this position, a lip 85 (FIG. 8A) abuts with axle 52 and fingers 48 and 50 to securely hold the switch. Conductors 84 and 86 extend from the switch for connection in electronic controller 26 (FIG. 13). Alternatively, a single finger 48 could be used to secure switch 51. This finger is pushed aside by insertion of switch 51 and snaps back when the switch is fully inserted. Because the switch snugly contacts the sides of aperture 46 and lip 85 abuts axle 52, a single finger 48 will hold the switch securely in the aperture.

To connect support 40 to bracket 42, axle 52 of support 40 is pressed into recesses 79 in arms 72 and 74 of bracket 42 (FIG. 7). Bracket 42 and support 40 are sufficiently resilient that the axle will slide between projections 75 and 77 and into the larger opening 90. Projections 75 and 77 hold the axle within opening 90 when the axle rotates. The axle pivots in opening 90 such that movement of lever 54 effects rotation of switch 51. However, there is sufficient friction between support 40 and axle 52 to help hold axle 52 against rotation when handle 54 is not actuated.

A grommet 92 (FIGS. 10-12) is positioned in the peripheral wall of housing 22. The grommet seals the opening through which axle 52 passes (FIGS. 2 and 10). The grommet is manufactured of any suitable material such as rubber. The grommet includes a central aperture 93 (FIG. 10) and an opening 94 for passage of axle 52 when grommet 92 is inserted onto the axle. Grommet 92 also includes a channel 95 (FIG. 11). The grommet is initially assembled over axle 52. The grommet with axle 52 is inserted into housing 22 such that the wall of housing 22 is received into channel 95. The grommet will close around and pinch axle 52 when the housing sections 28 and 30 are connected. Grommet 92 seals the opening and provides additional friction to hold axle 52 against rotation when lever 54 is not actuated.

The trigger point inertia switch 51 may be advantageously provided by a mercury switch, and more particularly, a mercury switch of the type having a cylinder 83 (FIG. 9) with mercury 88 therein and electrical contacts 87, 89 on one end. The switch is mounted such that the cylinder is angled with the contact end higher than the other end, as illustrated in FIG. 9. The mercury will normally rest in the cylinder at an end remote from the contacts. When braking of the towing vehicle causes the forward inertia of the mercury 88 relative to the towing vehicle and cylinder 83 to reach a level sufficient to overcome gravitational forces and move the mercury up tile side of the inclined cylinder, the mercury moves to tile contact end and electrically connects contacts 87, 89. This movement of mercury 88 occurs in a snap-like, sudden motion, when the deceleration resulting from tow vehicle braking causes a predetermined relative deceleration, or inertial threshold to be reached. It will be recognized that this relative deceleration threshold is dependent upon the angle A (FIGS. 8 and 9) between the longitudinal axis of the mercury switch cylinder 83 and the true horizontal plane. The larger this angle, the greater the force required to move the mercury up the side of the cylinder and into the contact end thereof.

The preferred angle A between the longitudinal axis of cylinder 83 and true horizontal is 23 degrees for reasons explained hereinafter. This is therefore preferably the angle which is implemented between the longitudinal axis AL (FIG. 5) of lever 54 and the lateral plane PL of platform 44. Because the longitudinal axis of switch 51 (FIGS. 8 and 9) is perpendicular to the lateral plane of platform 44, by pointing axis AL of lever 54 in a true vertical plane with lever 54 pointing down, the angle of mercury switch 51 will be 23 degrees relative to true horizontal. The operator may compensate for variations in the mounting angle of housing 22 by pointing lever 54 straight down, and be assured of having a preset angle of 23 degrees for mercury switch 51, relative to true horizontal. When mercury switch 51 is at an angle of 23 degrees relative to a true horizontal plane, switch 51 generates a braking force deceleration threshold, or inertia threshold, of 14 ft/sec/sec. The operator can adjust this angle to change the trigger threshold using lever 54, which effects rotation of support 40.

Electronic controller 26 will now be described with reference to FIG. 13. The electronic controller includes an input section 100, a gain control section 102, a controller section 104 and a driver 106. Section 100 is connected to the towing vehicle stoplight circuit. Driver 106 is connected to the towed vehicle brakes, represented by inductor coil L1. Sections 100, 102, 104 and 106 are connected to the positive terminal 12V of the towing vehicle battery.

Still more particularly, input section 100 includes a manually actuated switch SW1 connected to the 12-volt towing vehicle battery supply, a series circuit of a resistor R18 and a light emitting diode D10, and a supply rail 110. Supply rail 110 is connected to the towed vehicle stoplight circuit. A towing vehicle stoplight 111 is illustrated connected between rail 110 and circuit ground. A series circuit of an LED D2 (which is optically coupled to photodetector Q2), the collector-emitter path of a transistor Q1, and a resistor R2, is connected between supply rail 110 and ground. The base of transistor Q1 is connected to a junction 113. A resistor R1 connects junction 113 to battery terminal 12V and a capacitor C1 connects junction 113 to circuit ground. A diode D1 is connected between junction 113 and supply rail 110 to isolate the base of transistor 113 from the towed vehicle stoplight circuit when the towed vehicle stoplights are actuated. Resistor R1 and capacitor C1 are connected between the towing vehicle battery (12V) and ground potential, to provide a ramp voltage to the base of transistor Q1, responsive to which transistor Q1 regulates the current through LED D2 when the towing vehicle brakes are actuated, as described in greater detail hereinbelow. In the preferred embodiment, the resistor and capacitor have impedances selected such that the time required for the potential at the base of transistor Q1 to rise from ground to 12 Volts is approximately 3.5 seconds.

The input section 100 also has a manual control including switch SW1, potentiometer R6, the optic pair comprising, LED D10 and a transistor Q3, and resistors R17 and R18. Switch SW1 and the wiper arm of potentiometer R6 are operably coupled to actuator, or manual slide, 35. Switch SW1 includes contacts 96 and 97 (FIG. 1). Contact 96 is resilient and biased such that it separates from contact 97 when the actuator 35 is all the way to the right in FIG. 1, (in the rest position) but connects to contact 97 when the slide lever 35 moves to the left. Thus, when the manual slide 35 is in the rest position shown in FIG. 1, switch SW1 is open as contact 96 is held spaced from contact 97. Additionally, a shutter 98 is integrally formed with lever 35. Shutter 98 interrupts the optical path between diode D10 and photodetector Q3 when the manual slide is in the rest position. Movement of actuator 35 to the left in FIG. 1 moves shutter 98 out of the light path between LED D10 and photodetector Q3. Responsive to this movement, Q3 conducts. Movement of actuator 35 to the left in FIG. 1 also releases contact 96, such that it connects to contact 97, thereby closing switch SW1. Closure of switch SW1 connects the towing vehicle power supply 12V to the towing vehicle stoplights, thereby illuminating the stoplights. Actuator 35 is also connected to the wiper arm of potentiometer R6. Movement of actuator 35 thus varies the impedance between junction 118 and resistor R7.

The gain control section 102 includes a series circuit of resistor R4, a photodetector Q2, which is preferably a transistor coupled to LED D2, and a bilateral switch 112. This series circuit is connected between a supply rail 114 and floating ground 116. Potentiometer R6 is connected to the junction of resistor R4 and transistor Q2. Resistor R7 and manual control potentiometer R6 are connected in parallel with transistor Q2 and the inputs/outputs of bilateral switch 112. The junction 118 of resistor R4, transistor Q2 and resistor R6 is connected by a Zener diode D21 to floating supply rail 117. Junction 118 is also connected to one terminal of a resistor R5 which supplies an input current to the modulator circuit 104. The other terminal 120 of resistor R5 is connected to a capacitor C02. Capacitor C02 and resistor R8 are connected to modulator 104. Terminal 120 is also connected to a parallel connection of a high gain circuit 121 and a low gain circuit 123. The high gain circuit includes potentiometer R10, resistor R9 and a bilateral switch 122. The low gain circuit includes a potentiometer R12, a resistor R11 and a bilateral switch 144. The wipers of potentiometers R10 and R12 are connected to selectors 32 (FIG. 1) and 34, respectively, on housing 22. The high gain and low gain series circuits 121 and 123 are connected in parallel between terminal 120 and a diode D3.

The output pin 6 of integrated circuit U1 is connected to input pin 2 through a resistor R20, a diode D3, and either the high gain circuit 121 or the low gain circuit 123. The junction of diode D3 and resistor R20 is also connected through a diode D4 to output pin 8 of integrated circuit U1. Input pin 2 is also connected to resistor R5. Resistor R5 and gain circuits 121 and 123 set the gain of integrated circuit U1. The component values of the gain control 102 are preferably such that the output of circuit U1 will be up to 6 volts if the low gain circuit 123 is connected across U1 and in the range of 2 to 12 volts if the high gain circuit 121 is connected across U1. The potentiometers R10 and R12 are connected in the circuit to allow an operator to adjust each of these gains within their respective ranges.

Still more particularly, the gain control section 102 includes switches 112, 122, 144 and 150. These bilateral switches may be provided by any suitable device, such as commercially available CMOS integrated circuit number 4066. The control input of switch 122 is connected to one input/output of bilateral switch 150 and to a pull-up resistor R13. The control inputs of bilateral switches 150 and 144 are connected together, to mercury switch 51 through a resistor R15, and to a pull-up resistor R14. A capacitor C03 is connected in parallel with mercury switch 51 and resistor R15 to attenuate switching transients. The control inputs of switches 144 and 150 are also connected to the anode of diode D5. The cathode of diode D5 is connected to the control input of switch 112, the collector of a light responsive transistor Q3 and a pull-up resistor R17.

Sections 104 and 106 of the electronic controller are described in detail in U.S. Pat. No. 5,149,176, and United States patent applications 07/807,115, entitled IMPROVED CONTROLLER FOR ELECTRIC BRAKES SYSTEMS filed on Dec. 13, 1991, and 07/877,323, entitled CONTROL FOR ELECTRIC BRAKE SYSTEM filed Apr. 30, 1992, the disclosures of which are incorporated herein by reference. Accordingly, these circuit sections, and their operation, are not described in greater detail herein. However, in general, the integrated circuit U1 outputs pulses of current at pin 6 having an average value which is proportional to the signal level at input terminal 2. The output pulses at pin 6 are supplied to the gate of FET element Q4. FET element Q4 is responsive to the control pulses from integrated circuit U1 to input current pulses to brake actuation elements L1. The integrated circuit U1 utilized is a comparatively simple pulse-width modulator and may be implemented using a commercially available IC No. 3843 available from Unitrode.

In operation, controller 26 (FIG. 13) initializes automatic braking in response to the towing vehicle brake lights being actuated, which causes diode D1 to be reverse biased, whereby capacitor C1 and resistor R1 generate a ramp signal at the base of transistor Q1 which rises from 0.6 to 12 volts over a 3 second interval. The current entering the collector of transistor Q1 is dependent on the Q1 base voltage, and it will increase proportionally with the base drive ramp signal, such that the current through LED D2 increases proportionally to the ramp signal. The light emitted by LED D2 will likewise rise with this increase in current, effecting a proportional increase in the current in the collector-emitter path of photodetector Q2. The voltage at junctions 118 and 120 also rises proportionally with the current into the collector of transistor Q2, raising the magnitude of current input to pin 2 of circuit U1. The average value of the output pulses at pin 6 rises with the increase in the input signal level at pin 2. Driver element Q4 supplies current to the towed vehicle brake actuation elements L1 according to the output pulses at pin 6. Thus, during automatic towed vehicle brake actuation, the average magnitude of the brake excitation current will increase proportionally to the increase in the ramp signal at the base of transistor Q1.

If the relative braking inertia (deceleration) of the towed vehicle is below the selected switching threshold (e.g., preferably or nominally 14 ft/sec/sec) of mercury switch 51 during automatic braking, switch 51 is open. Additionally, during automatic braking, transistor Q3 is not activated by light from LED D10 as shutter 98 is positioned between diode D10 and photodetector Q3. Accordingly, switch 112 is enabled by the voltage across pull-up resistor R17, switches 144 and 150 are enabled by the voltage across pull-up resistor R14, and switch 122 is disabled by switch 150, which pulls the control input of switch 122 to ground. Accordingly, transistor Q2 is enabled and the low gain circuit 123 is connected to the electronic controller.

Mercury switch 51 is closed when the braking deceleration force exceeds the switching threshold of this switch (i.e., during hard braking). Closure of switch 51 connects resistor R15 between floating ground and the control input of switch 150 and switch 144. Because R15 has significantly less resistance than resistor R14, closure of switch 51 disables switches 150 and 144. When switch 150 is disabled, resistor R13 pulls the control input of switch 122 up to the floating potential on rail 117 (during brake actuation, rail 117 will rise to approximately 24 volts) and thus turns switch 122 on. Accordingly, the high gain circuit 121 is then connected into the feedback path of circuit U1. Additionally, because the anode potential of diode D5 is less than the cathode potential of this diode when switch 51 is closed, diode D5 isolates the control input to switch 112 from the control inputs of switches 144 and 150, such that switch 112 remains enabled during hard braking. This allows transistor Q2 to conduct when the mercury switch is closed.

If manual braking has not been initiated the manual slide 35 is in the rest position (FIG. 1), SW1 is open and mechanical shutter 98 interrupts the optic pair D10 and transistor Q3, and junction 130 is pulled high by resistor R17. As the manual slide is moved to the left in FIG. 1 to initiate manual braking, switch SW1 closes and mechanical shutter 98 moves out of the optical path between LED D10 and photo detector Q3, such that Q3 conducts pulling junction 130 low and disabling switches 112, 150 and 144. As the manual slide is moved to the left, the wiper of potentiometer R6 is moved to change the impedance between junction 118 and resistor R7. Closure of switch SW1 also inputs power to the towing vehicle stoplights through switch SW1, to actuate these lamps. Accordingly, transistor Q2 is disconnected from ground 116, disabling the photodetector, the low gain circuit is switched out, and the control input of switch 122 is pulled up. When the control input of switch 122 is pulled up to the floating power supply 117, the bilateral switch is enabled connecting the high gain circuit 121 into the feedback path of circuit U1. Thus, during manual braking, Q2 is disabled, and tile high gain circuit is connected to integrated circuit U1. With Q2 disabled, the integrated circuit U1 follows the signal at junction 118, which is adjusted by potentiometer R6. Because potentiometer R6 is controlled by selector 35, the operator can control the magnitude of vehicle braking manually using the selector.

Thus, it can be seen that a gain control for an electronic brake controller is disclosed which selects a high gain during hard braking or a low gain during soft, or low level braking. A trigger-point inertial sensor is used to distinguish hard braking from soft braking and thereby select the high or low gain. The inertial sensor provides a snap-action trigger which selects high gain as soon as hard braking begins. The magnitude of the current input to the brake coils will be a function of the gain of circuit U1, such that the higher gain of the high gain circuit 121 will result in larger brake currents being applied when the high gain circuit is connected in the feedback path of circuit U1 as compared to those generated when low gain circuit is connected in the feedback path of circuit U1. The controller section 104 will therefore produce harder braking when the high gain circuit is connected than when the low gain circuit is connected. The gain control produces improved performance during both hard and soft braking over known timer based controllers.

An electronic controller 27, according to an alternate embodiment of the invention, will now be described with reference to FIG. 14. The circuit of the alternate embodiment includes an input section 200, having a manual control with a potentiometer R30 coupled to selector 35 (FIG. 1) and an automatic control connected to the towing vehicle stoplight circuit (STOPLIGHTS in FIG. 14), a gain control section 202, a controller section 204, and a driver section 206. The input section 200 is connected to the battery positive BATT+ and battery negative BATT− terminals of the towing vehicle, as well as the towing vehicle stoplight circuit. The output 206 of the electronic controller is connected to the towed vehicle brake actuators represented herein by inductor L1.

Figure 14:
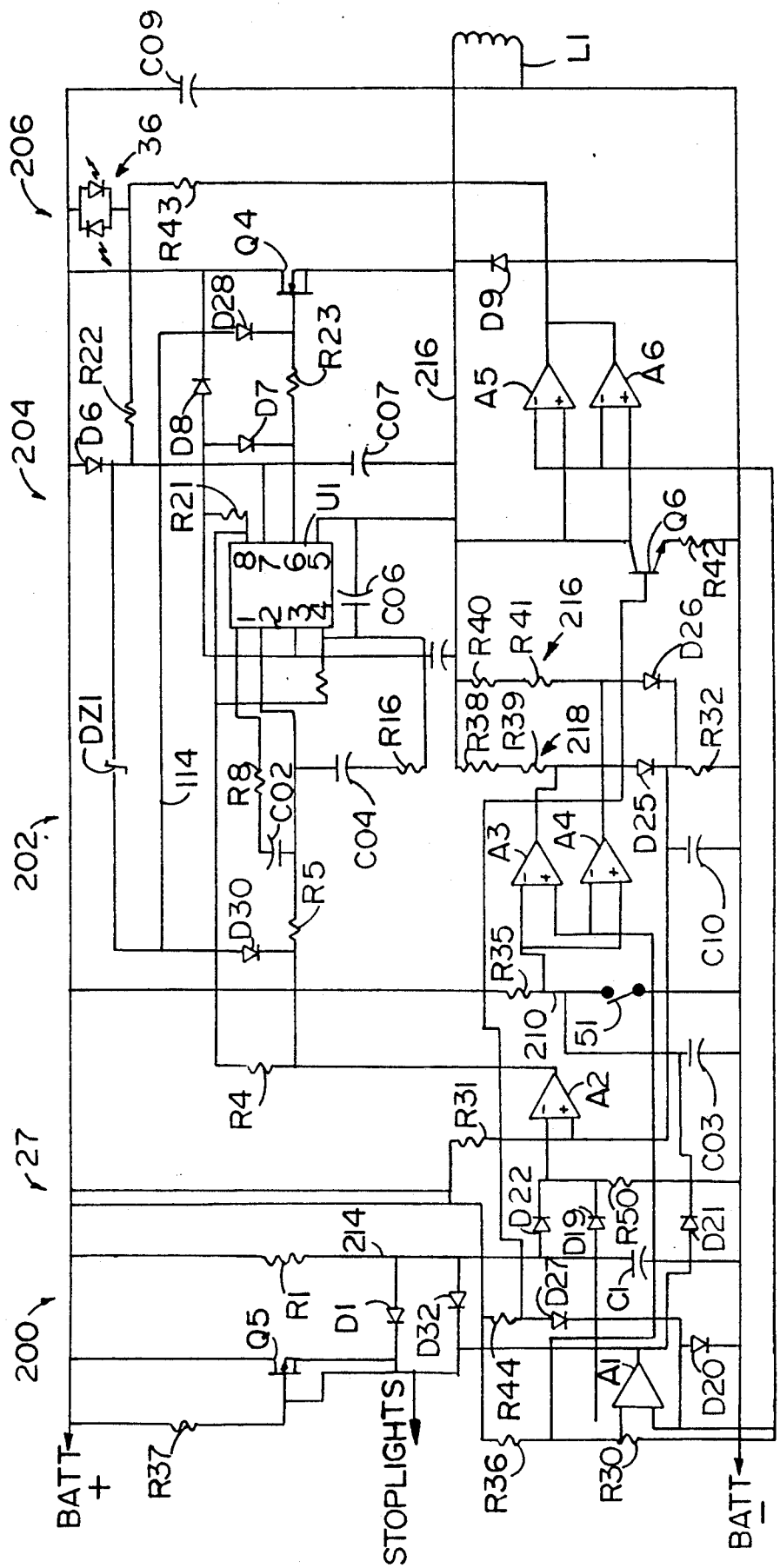
FIG. 14 is a schematic circuit diagram according to an alternate embodiment of the electronic controller of FIG. 13 and including a gain control in accordance with the invention.

More particularly, the manual control input section is controlled by selector 35 (FIG. 1) which is connected to the wiper of potentiometer R30 (FIG. 14). A diode D19 selectively connects the wiper of potentiometer R30 to the inverting input of a comparator A2. The non-inverting input of comparator A2 is connected to a reference potential set by resistors R31 and R32. For example, resistor R32 may have an impedance of approximately 39 KOkms and resistor R31 may have an impedance of approximately 1 MOhm, such that the potential at the non-inverting input is near, but slightly above, ground potential to compensate for offset resistor R4. The output of comparator A2 is connected to a pull-up resistor R4 and to the control input pin 2 of integrated circuit U1 through a resistor R5. Comparator A2 is responsive to the voltage of the wiper arm of potentiometer R30 being larger than the signal at the non-inverting input thereof for outputting a low level signal which controls U1 to initiate brake actuation, as described in greater detail hereinbelow.

A comparator A1 has an inverting input connected to the wiper arm of potentiometer R30. The non-inverting input of comparator A1 is connected to the anode of a Diode D20, such that the potential at the wiper of potentiometer R30 is compared to approximately 0.6 volt. The output of comparator A1 is connected to the gate of a transistor Q5. The gate of transistor Q5 is also connected to the towing vehicle battery positive terminal BATT+ through a resistor R31. Transistor Q5 is connected between BATT+ and the stoplight circuit of the towing vehicle. Transistor Q5 is switched on when the output of comparator A1 has a low level output to supply a signal on the stoplight conductor which illuminates the towing vehicle stoplights. Switch Q5 thus supplies energy to the towing vehicle stoplights to illuminate the same when the potentiometer R30 is actuated by manual selector 35 (FIG. 1'. Transistor Q5 may be provided by any suitable transistor such as a P-channel MOSFET element.

The output of comparator A1 is also connected via a diode D21 to a junction 210. When the output of comparator A1 is at a low value, diode D21 connects this output to junction 210, pulling junction 210 down to approximately ground potential to control the gain control section 202, as described in greater detail hereinbelow.

The automatic brake actuation signal is input from the towing vehicle stoplight circuit (STOPLIGHT). The stoplight circuit is connected through a diode D1 to a junction 214. Diode D1 disconnects junction 214 from the towing vehicle stoplight circuit when the towing vehicle stoplights are energized, but connects junction 214 to approximately circuit ground when the stoplights are not energized. Junction 214 is connected to the towing vehicle battery positive terminal (BATT+) by resistor R1 and to ground by capacitor C1. Junction 214 is connected via a diode D22 to the inverting input of comparator A2. Comparator A2 is responsive to signal at junction 214 rising above the non-inverting reference input of comparator A2 to supply a control signal to input pin 2 of integrated circuit U1. Integrated circuit U1 outputs a signal for actuating the towed vehicle brakes when comparator A2 has a low level output signal, as described in greater detail hereinbelow.

The gain control circuit 202 includes a trigger point inertia switch 51 connected to junction 210, comparators A3 and A4, low gain circuit 216, a high gain circuit 218, and a capacitor C03, which is connected across switch 51 to suppress switch bounce. More particularly, the inverting input of comparator A3 and tile non-inverting input of comparator A4 are connected to junction 210. Junction 210 is connected to the towing vehicle battery supply BATT+ by pull-up resistor R35. The non-inverting input of comparator A3 and the inverting input of comparator A4 are connected to the junction of resistor R30 and a resistor R36. Resistors R30 and R36 are connected between battery positive and battery negative of the towed vehicle. The potentiometer R30 and resistor R36 preferably have the same resistance, such that the potential at junction 133 is one-half the towing vehicle supply terminal BATT+. The output of comparator A3 is connected to the anode of a diode D25. The output of comparator A4 is connected to the anode of a diode D26. The cathodes of diodes D25 and D26 are connected to resistor R32. Still more particularly, the resistance of resistor R32 is substantially less than the resistance of resistor R31, as described briefly above, such that the potential at the cathodes of diodes D25 and D26 is near circuit ground. As can be seen, the outputs of comparators A3 and A4 have opposite output levels, and only one of them will have a high level output at any time. The comparator having a high level will unclamp its associated diodes D25 and D26 on, such that only one gain circuit is selected at any time.

The low gain circuit 216 includes a resistor R40 and a potentiometer R41 connected in series between floating ground 216 and the anode of diode D26. The high gain circuit 218 includes a resistor R38 and a potentiometer R39 connected in series between floating ground and the anode of Diode D25. Potentiometers R39 and R41 are connected to selectors 32 (FIG. 1) and 34, respectively, such that the vehicle operator can adjust the selectors to change the high and low gains independently of one another.

The electronic controller includes a transistor Q6 and an emitter resistor R42 connected between floating ground 216 and towing vehicle ground BATT−. The base of transistor Q6 is connected to the anode of a diode D27. The cathode of diode D27 is connected to the anode of a diode D20, the cathode of which is connected to ground. A resistor R44 is connected between the anode of diode D27 and battery positive BATT+. Accordingly, the voltage at the anode of diode D27 will be approximately 1.2 volts. This voltage controls the collector voltage of transistor Q6 such that it remains at approximately 0.8-1.0 volt above ground BATT− when the towed vehicle brakes are not connected. When the trailer brakes are connected to the electronic controller, and the towed vehicle brakes are not actuated, the voltage on conductor 216 drops to ground. When the towed vehicle brakes are energized by the electronic controller 20, resistor R42 allows floating ground 216 to rise to approximately BATT+. Transistor Q6 and resistor R42, with diodes D20 and D27 biased by resistor R44, form a current sink for a current level slightly more than the integrated circuit (U1) draws. When the trailer brakes are actuated, the current sink only draws current as set by the 0.6 volt across resistor R42.

Comparators A5 and A6, like comparators A1 through A4, are open collector comparators. The non-inverting inputs of comparators A5 and A6 are connected to the collector of transistor Q6 and the inverting inputs of these amplifiers are connected to the anode of diode D20. The outputs of comparators A5 and A6 have a low level when the towed vehicle brakes are connected but not actuated, as the voltage at the collector of transistor Q6 is approximately zero and thus less than the voltage drop of diode D20. This low signal level drives the green LED of diode pair 36 through resistor R43 providing the towed vehicle operator with an indication that the towed vehicle brake circuit is connected to the brake controller. Upon actuation of the towed vehicle brakes, the collector of transistor Q6 rises to approximately BATT+ when transistor Q4 conducts, causing the output of both comparators to turn off, thereby turning off the green LED of the red-green LED pair. When Q4 is not conducting, the collector voltage drops such that the outputs of both comparators will be turned on, causing the green LED to conduct. The duration that the red and green LEDs of LED pair 36 are illuminated is thus proportional to the pulse width output by integrated circuit U1, which controls transistor Q4. The merged color of the red-green LEDs, as viewed by the vehicle operator, will be dependent upon the pulse width of the actuation signals, as described in greater detail hereinbelow and in U.S. Pat. No. 5,149,176, to provide an indication of the magnitude of the brake current.

The control circuit 204 and driver circuit 206 are described in detail in U.S. Pat. No. 5,149,176 and U.S. patent application Nos. 07/807,115 and 07/877,323, the disclosures of which are incorporated by reference hereinabove. Accordingly, these circuit sections, and their operation, are not described in greater detail hereinbelow. However, it is briefly noted that diodes D28 and D30 in electronic controller 27 replace a Zener diode DZ2 which is shown in FIG. 13. The substitution of diodes D28 and D30 does not alter the operating characteristics of the control circuit 204. However, diodes D28 and D30 are substituted to reduce the cost of the electronic controller.

In operation, during manual brake actuation, the vehicle operator moves selector 35 from right to left in FIG. 1. Responsive thereto, the wiper arm of potentiometer R30 moves to increase the voltage at the inverting input of comparator A1 and comparator A2. The voltage at the inverting input of comparator A1 will rise above the reference potential of diode D20 (approx. 0.6 volt) almost immediately, which pulls the output of the comparator A1 to a low value. Junction 214 is also held low through diode D32 being forward biased, preventing capacitor C1 from charging through resistor R50. When the output of amplifier A1 goes low, the voltage across resistor R37 allows the gate of transistor Q5 to go to a low signal level, such that current is supplied to the towing vehicle stoplights. Additionally, the junction potential 210 is pulled to a low value. Comparator A3 biases diode D25 into a conducting stgte when the potential at junction 210 has a low level, such that the high gain circuit 218 is selected. The inverting input of comparator A2 will rise with the adjustment of potentiometer R30, and comparator A2 outputs a low level signal when the potential of the potentiometer wiper is greater than the potential at the non-inverting input of amplifier A2.

The current through resistor R5 drives an integrator in conjunction with integrated circuit U1 to gradually increase the pulse width of the pulses coming out of circuit U1. These pulses are delivered to MOSFET element Q4 to drive the brake magnets represented by inductor L1. The voltage on capacitor C10 is an average dependent upon the pulse width and the setting of the gain networks 216, 218 in conjunction with resistor R32. The pulse width of the pulses output by U1 will continue to increase until their average equals the voltage on the inverting input of comparator A2. At this point the output of comparator A2 will go high and the pulse widths will start to decrease. When their average again drops below the inverting input of comparator A2, the output of comparator A2 will pull low causing the pulse widths to increase. This action will continue so as to maintain the voltage on capacitor C10 near the voltage at the inverting input of comparator A2. By raising or lowering the potential at the wiper of potentiometer 30, the width of the pulses can be increased and decreased, thereby changing the magnitude of the brake actuation signal. The gain is adjusted by the vehicle operator selecting an impedance for potentiometer R39.

During automatic operation, the vehicle operator actuates the brakes of the towing vehicle, responsive to which the stoplight lamps are illuminated. The stoplight signal reverse biases diode D1, such that capacitor C1 charges through resistor R50 to a value of one-half BATT+ (if resistor R50 equals resistor R1), producing a ramp voltage which rises from a minimum level to a maximum level in approximately three seconds. When the potential of the inverting input of comparator A2 is less than the potential of the non-inverting input of comparator A2, pull-up resistor R4 is pulled down by the low level output voltage of comparator A2. This initiates brake excitation by integrated circuit U1 and element Q4.

The current through resistor R5 (FIG. 14) drives an integrator in conjunction with integrated circuit U1 to gradually increase the pulse width of the output pulses of circuit U1 as was the case with manual operation. These pulses are delivered to MOSFET element Q4 to drive the brake magnets represented by inductor L1. The voltage on capacitor C10 is an average voltage dependent upon the pulse width and the setting of the gain network 216, 218 in conjunction with the resistor R32. The pulse width of the pulses output by integrated circuit U1 will continue to increase until their average equals the signal level at the inverting input of a comparator A2. At this point, the output of comparator A2 will go high and the pulse width output by integrated circuit U1 will decrease. When the average signal at the non-inverting input of comparator A2 again drops below the inverting input of comparator A2, the output of comparator A2 will pull low causing the pulse width at the output pin 6 of U1 to increase. This action will continue so as to maintain the voltage on capacitor C10 near the voltage at the inverting input of comparator A2. As capacitor C1 charges such that the inverting input of comparator A2 ramps up from the minimum to the maximum value, the width of the pulses at output pin 6 of U1 will increase, thereby increasing the magnitude of the brake actuation signal applied to inductors L1. The pulse width of the output signals thus gradually increase over the three second interval.

During automatic braking, one or the other of gain circuits 216 and 218 is selected depending upon whether mercury switch 51 is open or closed. When mercury switch 51 is open, resistor R35 pulls junction 210 to battery positive BATT+. Accordingly, comparator A4 has a high output level and comparator A3 has a low output level. Diode D26 is therefore biased on and diode D25 is biased off, selecting low gain circuit 216. During automatic braking when mercury switch 51 is closed as a result of harder braking, the voltage at junction 210 is pulled down to circuit ground BATT−. This causes comparator A4 to output a low level signal and comparator A3 to output a high level signal. Accordingly, diode D26 is biased off and diode D25 is biased into conduction, selecting high gain circuit 218. The operator varies the impedance of potentiometer R39 to select a desired gain for the high gain circuit 218 used in hard braking. The operator selects a different gain for the low gain circuit 216 used in softer braking by varying the impedance of potentiometer R41. The voltage on capacitor C10 is an average voltage dependent upon the pulse width and the setting of the feedback or gain networks 216, 218 in conjunction with resistor R32.

Transistor Q6 and resistor R42 with diodes D20 and D27 biased by resistor R44 form a current sink set for a current level slightly more than the modulator circuit draws. This keeps the floating ground slightly (approximately 0.8 volt) above BATT−. This in turn prevents electrolysis in the connector. When the trailer brakes are connected this voltage drops to near ground potential. When the trailers are actuated the current sink still only draws the current set by the 0.6 volt drop across resistor R42.

Comparators A5 and A6 compare the voltage of the floating ground to the voltage at the anode of diode D20. When the trailer brakes are not connected to voltage of the floating ground is approximately 0.8 volt and the output of the two comparators is high so the green LED is not activated. However, when the trailer brakes are connected, the voltage of the floating ground is very low by virtue of the low impedance of the trailer brakes. The output of the comparators A5 and A6 is now low, driving the green LED to indicate connection of the trailer brakes. When the brakes are activated, the voltage of tile floating ground rises to near BATT+ causing the green LED to be off during that portion of the cycle. At the same time, the floating ground 216 rises 12 volts above BATT+ biasing the red LED on. The bi-color LED circuit therefore, flashes between red and green to produce a range of colors.

Thus it can be seen that the circuit according to FIG. 14 provides the same advantages of the circuit of FIG. 13. Additionally, the circuit according to FIG. 14 controls the voltage on conductor 216 such that tile risk of electrolysis is reduced when the towed vehicle is not connected to the towing vehicle. More specifically, conductor 216 is held to approximately 0.8 volt by transistor Q6 when the towed vehicle is not connected to the electronic controller 27. However, when the towed vehicle is connected to the electronic controller, the voltage on conductor 216 is held at ground BATT− when the towed vehicle brakes are not actuated and rises to approximately BATT+ during braking. This reduces the amount of time that conductor 216 can rise significantly above ground potential, thereby reducing the amount of time that electrolysis can occur if salt water contacts conductor 216. It will be recognized that the risk of salt contacting this conductor is greatest when a towed vehicle is not connected to the electronic controller since a plug (not shown) on the towing vehicle will be exposed when the towing vehicle electrical system is not connected thereto. Consequently, the risk of corrosion of conductor 216 when a towed vehicle is not connected to the towing vehicle is reduced.

It is to be understood that the foregoing description of the preferred embodiments of the invention is provided for purposes of illustration, and not as a measure of the invention, whose scope is to be defined by reference to the ensuing claims. Thus, those skilled in the art may devise embodiments of the particular concepts presented in the foregoing illustrative disclosure which differ from the particular embodiments shown and described in detail herein, or make various changes in structural details to the illustrated embodiments. For example, although the preferred embodiment of the invention includes a mercury switch, it is envisioned that other gravity-type or inertia responsive switches could be used to provide a trigger-point switching function. For example, a conductive ball can be suspended in a conductive cylinder by a wire. The ball will contact the cylinder when the inertial force due to deceleration exceeds a predetermined limit. The limit is dependent upon the diameter and length of the wire, the mass and dimension of the ball, and the relative contact points of the ball and cylinder. Another alternative is to use a pendulum and optical pair similar to those disclosed in U.S. Pat. No. 5,058,960 incorporated hereinabove. The output of such a sensor would be used with an associated comparator having a selected reference input that is compared to the output of the inertial sensor. When the optical devices utilized with such an inertial sensor output a signal exceeding the reference level, the braking inertia (i.e., deceleration forces) will be detected as exceeding the threshold. This latter technique permits the threshold to be readily adjusted by simply varying the reference level. Additionally, it is envisioned that additional gain paths or profiles could be provided by additional switches and additional impedances. Thus, three, four, or more gains can be provided by the controller for different degrees of braking deceleration. Accordingly, all such alternative or modified embodiments which utilize the underlying concepts of the invention and incorporate the spirit thereof are to be considered as within the scope of the claims appended hereinbelow, unless such claims by their language specifically state otherwise.

The embodiments of the invention in which an exclusive property or privilege is claimed are defined as follows:

1. In an electronic controller for electrically actuated vehicle brakes including a controller circuit producing pulses of current whose average magnitude is gradually increased for correspondingly energizing the vehicle brakes, the improvement comprising a variable gain control for said controller circuit having at least two gain levels and a trigger point inertial deceleration sensor connected to select one or the other of said gain levels to vary the gain of said controller circuit, said sensor selecting a low gain when detected deceleration is below a threshold and selecting a high gain when the detected deceleration is above said threshold.

2. The electronic controller as defined in claim 1, wherein said variable gain control includes at least two impedance elements having different impedances, wherein one of said elements is selected to provide said low gain and the other one of said elements is selected to provide said high gain.

3. The electronic controller as defined in claim 2, wherein said trigger point inertial sensor includes a switch operably coupled to said impedance elements for selecting either of said impedance elements, and said sensor includes means for toggling said switch when the detected deceleration exceeds said threshold to select said high gain.

4. The electronic controller as defined in claim 3, wherein said switch is a mercury switch.

5. The electronic controller as defined in claim 4, wherein said mercury switch is supported on a movable platform such that an angle between said switch and a horizontal plane can be adjusted to change said threshold.

6. The electronic controller as defined in claim 5, further including a housing enclosing said controller circuit.

7. The electronic controller as defined in claim 6, wherein said movable platform is mounted on said housing by a pivotable member.

8. The electronic controller as defined in claim 7, further including a handle extending out of said housing and connected to said platform, whereby said handle when moved will pivot said mercury switch to adjust said angle and thereby to adjust said threshold.

9. The electronic controller as defined in claim 1, further including an adjuster for varying said threshold.

10. The electronic controller as defined in claim 9, wherein said adjuster includes a handle which is manipulatable by a vehicle operator to move said adjuster and thereby vary said threshold.

11. The electronic controller as defined in claim 1, further including a control element for implementing manual brake actuation, said gain control selecting said high gain when the vehicle brakes are actuated using said control element.

12. The electronic controller as defined in claim 1, further including,
  a conductor adapted to be connected between said controller circuit and the vehicle brakes whereby said pulses of current are applied to the vehicle brakes through said conductor; and
  a control coupled to said conductor for holding said conductor at a first level which is approximately ground potential when the vehicle brakes are not connected thereto and allowing said conductor to rise above said first level to apply said pulses of current when connected to said brakes and brake excitation pulses are output by said electronic controller.

13. A method of changing the gain of an electronic controller generating current pulses for actuating vehicle brakes of a towed vehicle, comprising the steps of:
  detecting the deceleration of the towed vehicle during braking;
  selecting a first gain for said controller when the deceleration during braking is below a threshold; and
  selecting a second gain for said controller when the deceleration during braking is above said threshold.

14. The method as defined in claim 13, wherein said step of detecting detects a snap closure of a gravity responsive switch when said threshold is reached.

15. A method as defined in claim 13, further including setting said first gain using at least one first impedance element, and setting said second gain using at least one second impedance element.

16. The method as defined in claim 15, wherein a gravity responsive switch selects said at least one first impedance element or said at least one second impedance element.

17. A controller for actuating towed vehicle brakes, comprising:
  a housing;
  a control circuit positioned in said housing, said control circuit adapted to apply controlled current pulses to said brakes;
  a trigger point inertial sensor mounted in said housing; and
  a gain controller coupled to said inertial sensor and said control circuit, said gain controller adapted to provide one of at least two different gains to said control circuit to said trigger point inertial sensor, whereby when said trigger print inertial sensor detects towed vehicle braking deceleration less than a given threshold amount, the gain controller provides said control circuit with a low-level gain, and when said trigger point inertial sensor detects towed vehicle braking deceleration above said threshold, the gain controller provides said control circuit with a high-level gain.

18. The controller as defined in claim 17, wherein said trigger point inertial sensor includes a switch.

19. The controller as defined in claim 18, wherein said switch is mounted on a platform, and said platform is mounted in said housing.

20. The controller as defined in claim 19, wherein said platform is connected to an axle which is supported in said housing such that said platform is pivoted on said axle to adjust said threshold.

21. The controller as defined in claim 20, including a handle having a predetermined angular displacement with respect to said switch, such that positioning said handle at a predetermined orientation sets the threshold of said switch to a predetermined value to compensate for variations in the mounting position of the brake controller.

22. The controller as defined in claim 21, wherein said switch is a mercury switch.

23. A trigger point inertial sensor for an electronic brake controller including a housing, comprising:
  an axle rotatably supported in the housing;
  a platform connected to said axle which rotates with said axle;
  a handle connected to said axle and accessible from outside of the housing to control the position of said platform and axle; and
  a switch adapted to be coupled to the electronic brake controller, said switch positioned on said platform whereby the orientation of said switch is adjusted using said handle.

24. The sensor as defined in claim 23, further including a bracket mounted in the housing, said axle rotatably mounted to said bracket. mercury switch.

25. The sensor as defined in claim 24, wherein said switch is a mercury switch.

26. A controller for selectively actuating vehicle brakes of a towed vehicle, comprising:
  an electronic controller adapted to generate brake excitation pulses;
  a conductor connected to said electronic controller and adapted to be connected to the vehicle brakes wherein said brake excitation pulses are applied to the vehicle brakes through said conductor when said conductor is connected to the vehicle brakes; and
  a control coupled to said conductor for holding said conductor at approximately ground potential when the vehicle brakes are not connected to the electronic controller and allowing said conductor to rise to apply said braking current to said towed vehicle brakes when the vehicle brakes are connected to said electronic controller and said brake excitation pulses are output by said electronic controller.

27. The controller for selectively actuating vehicle brakes as defined in claim 26, further including a variable gain control for said controller having at least two gain levels and a trigger point inertial sensor connected to select one of said gain levels to adjust the gain of said controller, said sensor selecting a low gain level when detected braking deceleration is below a threshold and selecting a high gain when detected braking deceleration is above said threshold.

28. The controller for selectively actuating vehicle brakes as defined in claim 26, wherein said control is a regulator connected between said conductor and ground potential.

29. An electronic controller for actuating vehicle brakes of a towed vehicle, comprising:

a comparator having a first input connected to receive a control signal and a second input connected to receive a reference signal;

a controller circuit having an input coupled to an output of said comparator and an output adapted to be coupled to the vehicle brakes, said controller circuit generating pulses of current at said output of said controller circuit as a function of an output signal from said comparator;

a variable impedance device coupled to said controller circuit; and a selector coupled to said variable impedance device, said selector selecting at least one of said impedances dependent upon the braking deceleration of the towed vehicle, whereby said selected impedance is utilized for generating said reference signal, and said reference signal is varied using said selector.

30. The electronic controller as defined in claim 29, wherein said variable impedance device includes a plurality of impedance elements.

31. The electronic controller as defined in claim 30, wherein said selector includes at least one mercury switch for selecting at least one of said impedances.

* * * * *

UNITED STATES PATENT AND TRADEMARK OFFICE
CERTIFICATE OF CORRECTION

PATENT NO. : 5,333,948
DATED : August 2, 1994
INVENTOR(S) : AUSTIN ET AL.

It is certified that error appears in the above-indentified patent and that said Letters Patent is hereby corrected as shown below:

Column 2, line 62;
   "tile" should be --the--.

Column 3, line 19;
   "file" should be --the--.

Column 6, line 32;
   After "higher" delete --'- --.

Column 6, line 39;
   "tile side" should be --the side--.

Column 6, line 40;
   "tile contact" should be --the contact--.

Column 10, line 24;
   "tile" should be --the--.

Column 11, line 6;
   "KOkms" should be --KOhms--.

Column 11, line 34;
   "(FIG. 1'" should be --(FIG. 1)--.

Column 11, line 67;
   "tile" should be --the--.

Column 13, line 51;
   "stgte" should be --state--.

Column 15, line 23;
   "connected to" should be -connected the--.

UNITED STATES PATENT AND TRADEMARK OFFICE
CERTIFICATE OF CORRECTION

PATENT NO. : 5,333,948
DATED : August 2, 1994
INVENTOR(S) : AUSTIN ET AL.

It is certified that error appears in the above-indentified patent and that said Letters Patent is hereby corrected as shown below:

Column 15, line 32;
　　"tile" should be --the--.

Column 15, line 41;
　　"tile" should be --the--.

Column 18, line 5;
　　"print" should be --point--.

Column 18, line 45;
　　After "bracket." delete --mercury switch.--.

Column 18, lines 61 and 62;
　　After "conductor" delete --to rise--.

Signed and Sealed this

Eighteenth Day of July, 1995

Attest:

BRUCE LEHMAN

*Attesting Officer*　　*Commissioner of Patents and Trademarks*